(12) United States Patent
Nadarajah et al.

(10) Patent No.: US 7,472,722 B2
(45) Date of Patent: Jan. 6, 2009

(54) METHOD OF PERMANENTLY REPAIRING A PIPELINE SECTION USING A COMBINATION WRAP AND SLEEVE STRUCTURE

(75) Inventors: Nagendran A/L C. Nadarajah, Kuala Lumpur (MY); Renata Anita De Raj, Kuala Lumpur (MY); Leong Kok Hoong, Kajang (MY)

(73) Assignees: Petronas Research & Scientific Services SDN. BHD., Kajang (MY); Orinippon Trading SDN. BHD., Salangor (MY)

( * ) Notice: Subject to any disclaimer, the term of this patent is extended or adjusted under 35 U.S.C. 154(b) by 17 days.

(21) Appl. No.: 11/487,562

(22) Filed: Jul. 13, 2006

(65) Prior Publication Data
US 2007/0018448 A1    Jan. 25, 2007

Related U.S. Application Data (62) Division of application No. 10/664,807, filed on Sep. 17, 2003, now Pat. No. 7,168,743.

(30) Foreign Application Priority Data

Sep. 17, 2002   (MY) .............................. P1 20023462
Jul. 21, 2003   (MY) .............................. P1 20032723

(51) Int. Cl.
*F16L 55/16*   (2006.01)
(52) U.S. Cl. .................... 138/99; 138/97; 264/36.17
(58) Field of Classification Search ................... 138/99, 138/97; 264/36.17
See application file for complete search history.

(56) References Cited

U.S. PATENT DOCUMENTS

| 647,996 | A | * | 4/1900 | Smith ...................... 164/92.1 |
| 904,870 | A | | 11/1908 | Heidecke et al. |
| 1,568,268 | A | * | 1/1926 | Clark et al. ................ 285/373 |
| 1,940,729 | A | * | 12/1933 | Pfefferle ..................... 285/337 |
| 1,953,493 | A | * | 4/1934 | McKee ....................... 277/616 |
| 2,188,302 | A | * | 1/1940 | Pfefferie ...................... 138/99 |
| 2,288,225 | A | * | 6/1942 | Boughton ................... 285/372 |
| 2,450,458 | A | | 10/1948 | Thompson et al. |
| 2,464,744 | A | | 3/1949 | Fennema |
| 2,651,329 | A | | 9/1953 | Fowler, Jr. |
| 2,775,469 | A | | 12/1956 | Brown et al. |
| 2,899,983 | A | | 8/1959 | Farris |
| 2,924,546 | A | * | 2/1960 | Shaw .......................... 156/94 |
| 4,635,970 | A | | 1/1987 | Haines |
| 4,648,631 | A | | 3/1987 | Bryant |
| 4,653,782 | A | | 3/1987 | Munday |
| 4,749,215 | A | | 6/1988 | Martin |

(Continued)

Primary Examiner—James F Hook
(74) Attorney, Agent, or Firm—Occhiuti Rohlicek & Tsao LLP (57) ABSTRACT

The invention relates to a permanent method of repairing leaking, damaged, or weakened pipe by grit blasting the pipe (10), followed by wrapping it with a fiber reinforced composite material (12), then installing two half oversized steel sleeves (14). After that the non-gaseous matter is removed by fresh water and compressed air or inert gas. An epoxy or cementitious grout or combination of both is finally injected into annular chamber 20 of the sleeves through pre-installed inlet port (16) and outlet port (18). The epoxy or cementitious is then allowed to cure. The terminal end of the steel sleeves may be sealed using a pair end flanges (32) matingly securable to a pair of terminator bodies (45).

3 Claims, 8 Drawing Sheets

U.S. PATENT DOCUMENTS

| | | | |
|---|---|---|---|
| 4,756,337 A * | 7/1988 | Settineri | 138/99 |
| 4,927,182 A | 5/1990 | Moore | |
| 5,090,742 A | 2/1992 | Cohen et al. | |
| 5,118,139 A | 6/1992 | Lott | |
| 5,345,972 A * | 9/1994 | Goglio et al. | 138/99 |
| 5,467,795 A * | 11/1995 | Martin et al. | 137/15.11 |
| 5,480,193 A | 1/1996 | Echols et al. | |
| 5,894,864 A * | 4/1999 | Rich | 138/99 |
| 6,276,726 B1 | 8/2001 | Daspit | |
| 6,305,719 B1 | 10/2001 | Smith et al. | |
| 6,467,811 B2 | 10/2002 | Mitchell | |
| 6,543,487 B2 * | 4/2003 | Bazinet | 138/99 |
| 6,675,836 B1 | 1/2004 | Gaston et al. | |
| 2002/0021004 A1 | 2/2002 | Mitchell | |
| 2002/0121777 A1 | 9/2002 | Krout et al. | |

* cited by examiner

METHOD OF PERMANENTLY REPAIRING A PIPELINE SECTION USING A COMBINATION WRAP AND SLEEVE STRUCTURE

This application is a divisional of U.S. patent application Ser. No. 10/664,807, which was filed on Sep. 17, 2003, now U.S. Pat. No. 7,168,743. The disclosure of the prior application is considered part of (and is incorporated by reference in) the disclosure of this application.

FIELD OF DISCLOSURE

The invention relates to a method and means of repairing a pipe more particularly the invention relates to a method and means of repairing a damaged pipe without isolating the pipe or without stopping the flow of materials within the pipe.

BACKGROUND

When pipe repairs are to be carried out, three main repair scenarios are normally encountered. This will include (i) pipes subject to external metal loss (caused by corrosion or mechanical damage), (ii) pipes subject to internal metal loss (caused by corrosion, erosion or erosion/corrosion) and (iii) piping components that are leaking. In addition to these main repair scenarios, the extent of the deterioration or damage (i.e. localized or extensive) has also to be considered when choosing the repair methods and repair components.

Current repair methods include clamps (localized repairs) and specialized connectors with sleeves (extensive repairs). It is equally possible to encircle the defective area with close fit metallic sleeves which are welded together. This, however, has to be seal welded. These methods could cause weld induced damage or material property changes on the pipe being repaired. In underwater conditions this may require specialist habitats to carry out hyperbaric welding. This can prove costly and can pose additional dangers. Welding on live pipelines poses further additional dangers.

Condition and extent of damage of the pipe essentially dictates the type of repairs to be carried out. If the external surface is damaged to the extent that an elastomeric seal cannot provide sufficient sealing forces in the immediate vicinity of the damage, or in the relatively unaffected areas adjacent to the major damage (these areas being used to effect the sealing forces of 'stand'-off repair clamps), the external pipe surface may need to be re-installed using some form of filler material. Developments using epoxy-filled steel sleeves have been shown to accommodate such areas of extensive damage and have applications for a whole range of defects including corrosion, non-propagating cracks, dents or gouges in both axial and circumferential orientation, and girth weld associated anamolies. The epoxy-filled sleeve repair technique is typically recommended on areas operating below 100 barg with temperatures not exceeding 100° C. It was assumed that epoxy filled sleeves can be used for leak containment. However in various tests conducted it has been found that the sleeves were only able to contain leaks below 40 barg. Additional tests were conducted to determine if pumping epoxy and allowing it to cure under pressure i.e. in equilibrium pressure (to that within the pipe) would produce better results. The tests prove that higher pressures are obtained but in practical terms this will involve derating the pipe or suspending production and could prove costly for operators. There is a need therefore to develop a method where the pipes can be repaired without derating the pipe or suspending the throughput of the pipe.

The prior art method is expensive in that heavy duty connectors dimensioned to fit the damaged pipes, need to be provided. Such connectors are expensive and take substantial man-hours to design, manufacture and assemble. The prior art composite fibre wraps which has a pressure limit not exceeding 40 barg. When the axial pressure exceeds 40 barg or when used in isolation are considered temporary repairs.

SUMMARY

The invention discloses a permanent method of repairing or reinforcing a weakened area in a pipeline section. The method includes removing rust, old coating and other unwanted surface blemishes by grit blasting. Then the leaking, damaged or weakened surface are wrapped with at least one layer of reinforced composite wrap material. The composite wrap is left to cure. If necessary, to further mechanically strengthen the affected portion of the pipeline, the pipeline in the affected areas is encapsulated by sleeves. Optionally, a wear plate can be placed between the affected portion of the pipeline and the composite wrap material. Two half oversized steel sleeves are installed over the pipe section and bolted together or seal welded together and thus forming an annular chamber. Non gaseous matter in the annular chamber is removed by flushing with fresh water and followed by flushing with inert gas or atmospheric air. Load bearing epoxy or cementitious grout with high compressive strength in excess of 110 Mpa or combination of both separated by chambers is then introduced into annular chamber. Finally the grout/combination of grout is allowed to cure. The above invention is used for pipelines submerged in water or sea. Alternatively the same method can be done for pipelines on land except the procedures are modified where by the two half oversized steel sleeves can be welded together and the flushing with fresh water will no longer be required. The unwanted matter can be flushed out using compressed air or inert gas.

In another aspect, the invention discloses a means to seal the terminal ends of the two half oversized sleeves, positionable on the external circumferential side of affected riser pipes. The means comprises of a pair of flange bodies integral to the two half oversized sleeves and a pair of terminator bodies. Each flange body includes a semi-circular collar with a plurality of bores thereon and a semi-circular lip. The terminator body includes a semi-circular collar with a plurality of bores thereon, and a semi-circular recess structured and configured to receive the semi-circular lip. A graphite body is introduceable into the semi-circular recess. The terminator body is secured against the flange body by tightening of nuts and bolts introduced between the bores (apertures) in the flange body and the terminator body.

In another aspect, the flange ends of the two half oversized steel sleeves are serrated along the longitudinal axis and sheets of PTFE body is placed between the two steel sleeves before the steel sleeves are bolted together by nuts and bolts.

BRIEF DESCRIPTION OF THE DRAWINGS

The invention will be described in reference to a preferred embodiments of the invention with reference to the following diagrams.

DETAILED DESCRIPTION

Figure 1:
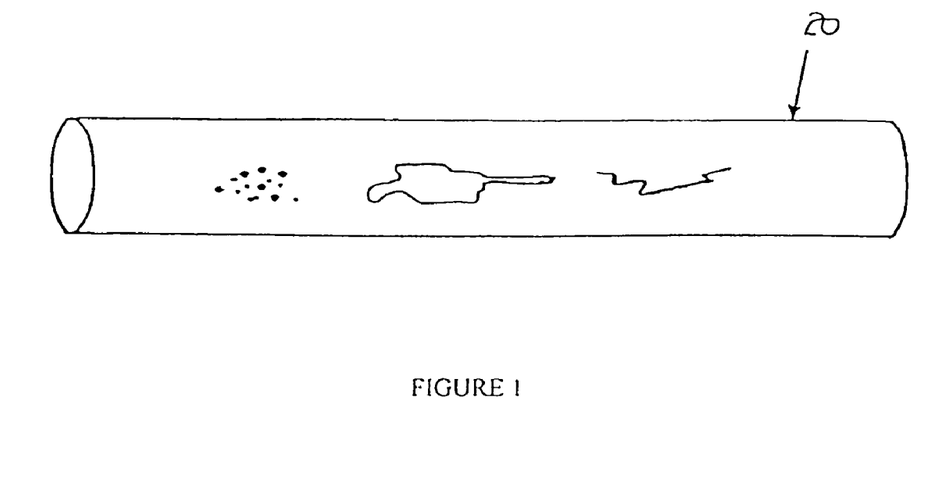
FIG. 1 shows a leaking, damaged or weakened surface area and the area beyond the leaking, damaged or weakened surface portion of pipeline is to be grit blasted.

The surface of a damaged/deteriorated pipe (20) is prepared first by grit blasting to remove rust and remnants of old coating. Grit blasting is known as one of abrasive blasting. The blasting of the pipe (20) is carried out by sweep blasting using fine abrasives not containing iron (e.g. garnet, aluminum oxide), glass pearls or stainless steel shot. Maximum speed and most effective cleaning is obtained by systematic blasting. Work is blocked out in 30 cm squares and each square blasted evenly until complete. A minimum of 25 mm into any adjacent coated area is continued by blasting and the edges are feathered.

Figure 2:
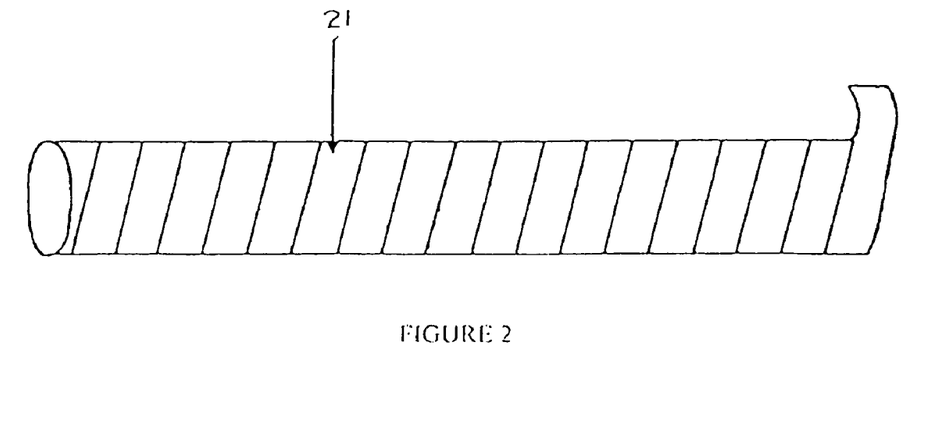
FIG. 2 shows a leaking, damaged or weakened surface area wrapped with fibre reinforced wrap.
Figure 3A:
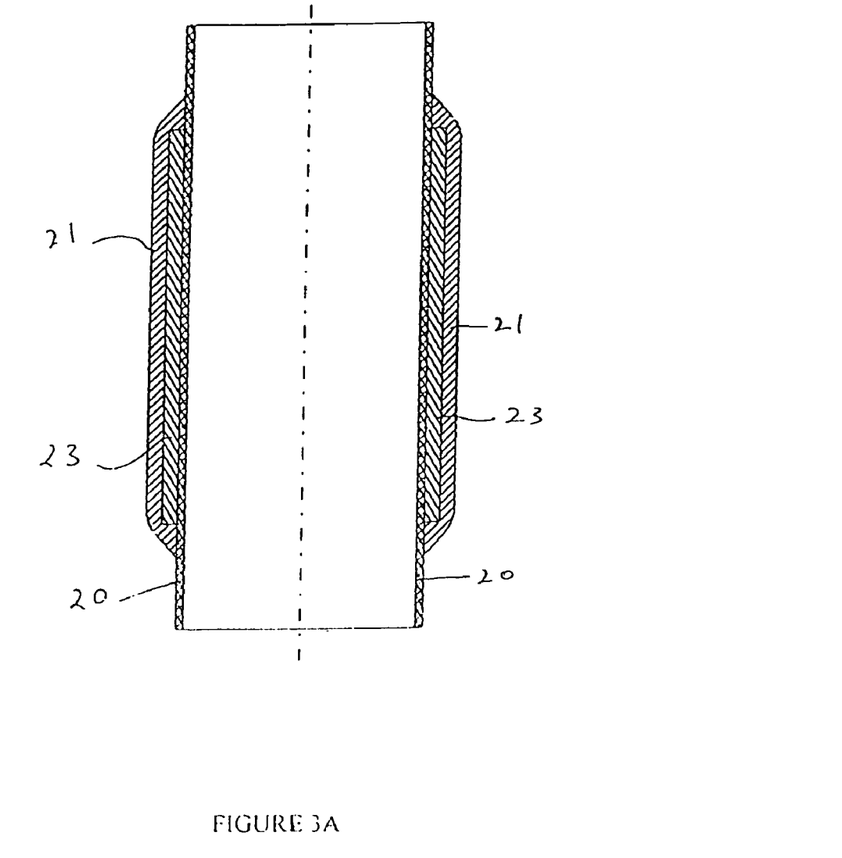
FIG. 3A shows longitudinal cross-sectional views of a pipe being repaired with a wear plate and wrap around fibre reinforced wrapped.
Figure 3B:
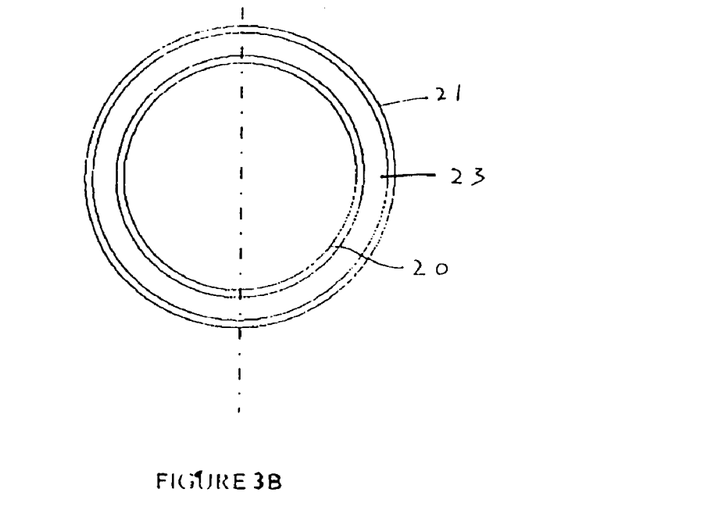
FIG. 3B shows a cross sectional view of pipe in FIG. 4.
Figure 4:
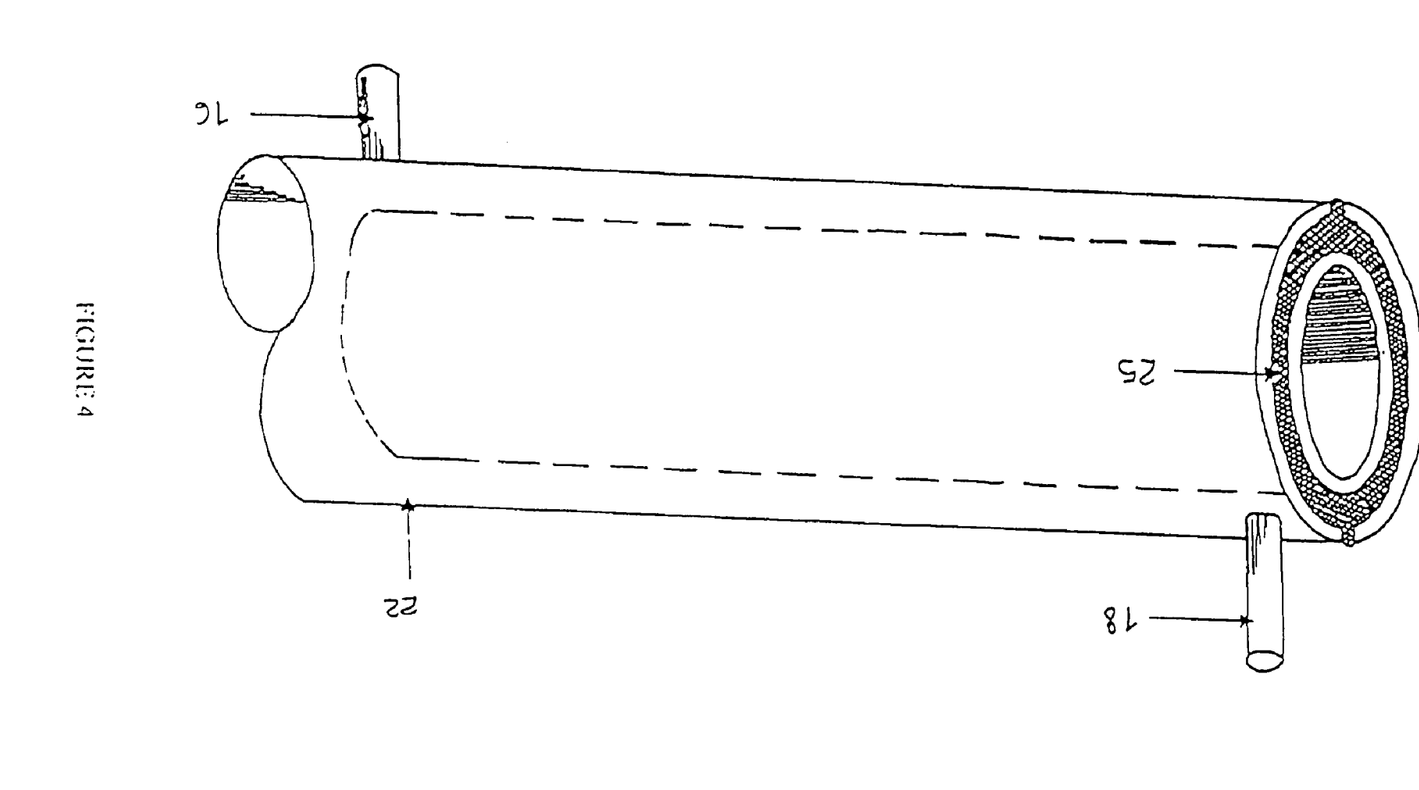
FIG. 4 shows an enclosure of the surface area with two half oversized steel sleeves with inlet and outlet port. (Details of bolts and nuts or welds not shown).

Then the thinned down, leaking or affected area is wrapped around with a fibre reinforced composite wrap (21) capable of curing under water and standing pressure. Example of a wrap is a fiberglass cloth pre-impregnated with a resin that can be activated by salt or fresh water. (FIG. 2) Optionally, wear plates (23) can be used in addition to the fiberglass wrappings to reduce the risk of damage due to corrosion and erosion. (see FIG. 3). The fiberglass as sourced is packaged in a hermetically sealed foil pouch, it is ready to use and does not require any measuring or mixing. It has an initial settling time of only 30 minutes (24° C.). Preferably the fiberglass should be spirally wrapped with overlapping layers. The number of wraps depends upon the operating pressure desired; the greater the pressure the more wraps. Once the wrap is cured, it is preferable to control blast to create an anchor pattern for the epoxy or grout to be subsequently injected.

The above described embodiment is acceptable for temporary repairs of affected riser pipes. To provide a more permanent solution, a further strengthening of the affected area of the riser is required.

Figure 5:
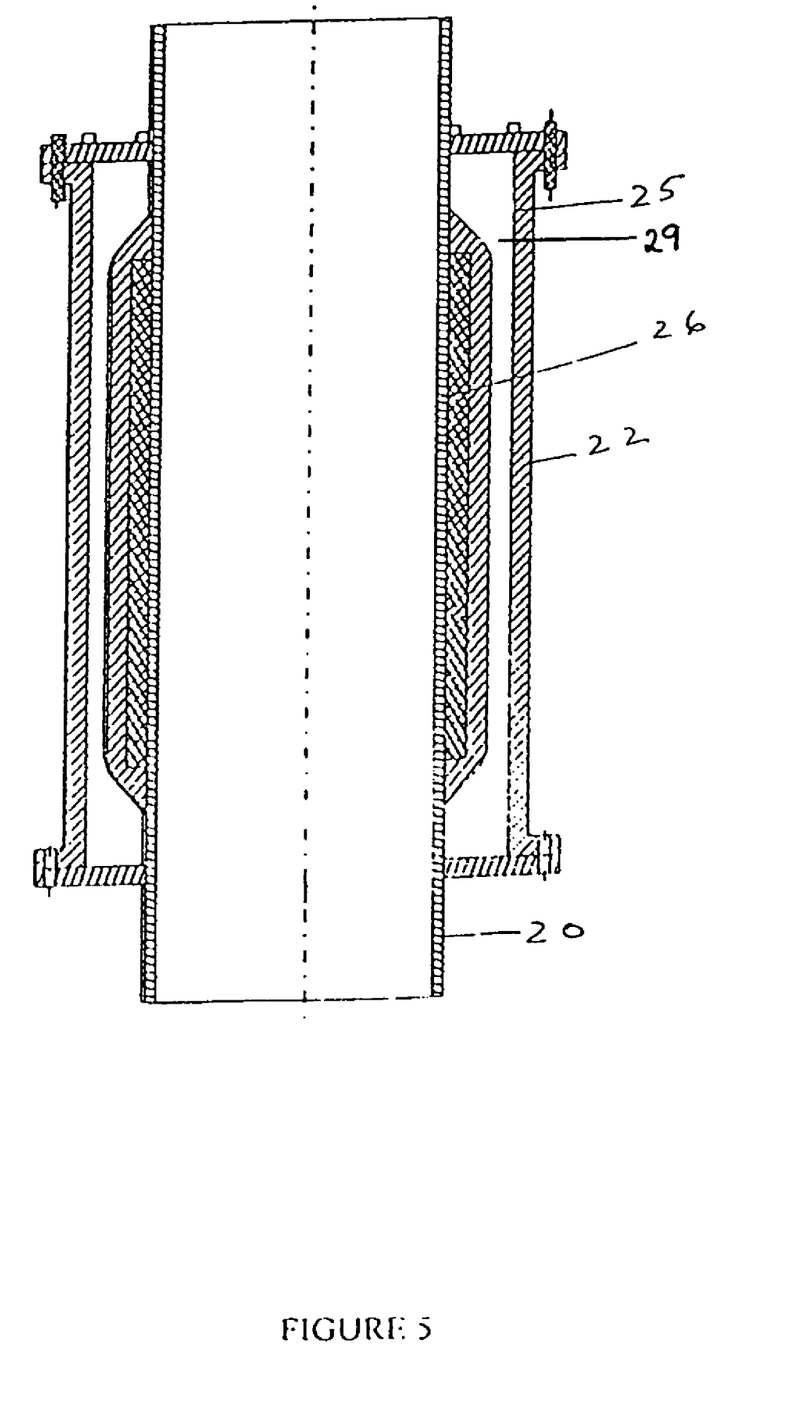
FIG. 5 shows diagrammatic longitudinal and cross-sectional views of a pipe being repaired with a wear plate (optional) wrapped around fibre reinforced wrap, enclosed in sleeves with annular chamber filled with grout.
Figure 8:
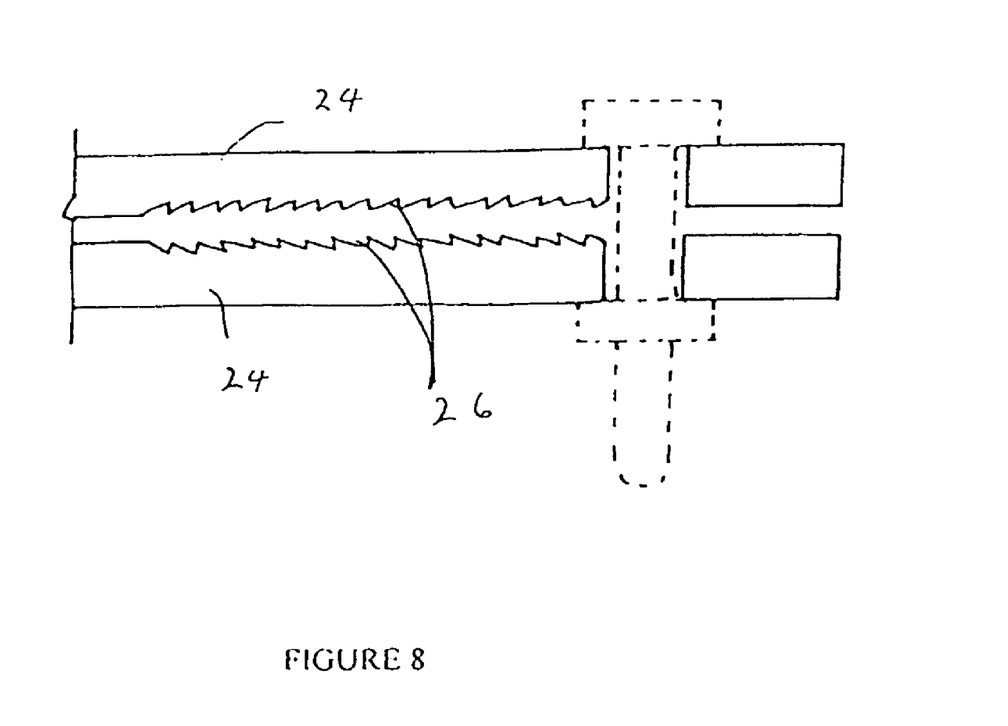
FIG. 8 shows a detailed partial sectional view of the seal wings of the sleeves.

Two half oversized matingly engageable steel sleeves (22) are then installed covering and extending to beyond the deteriorated part of a pipe (26) (FIG. 5). The extension of the sleeves (22) beyond the deteriorated part of the pipe is to cater for axial loads of the material transported within the pipe. The sleeves are welded or bolted together around and beyond the damaged/deteriorated or corroded area. When the sleeves are secured together by nuts and bolts, then one surface of the flange of each sleeve is serrated all along one side of the length of the sleeves (see FIG. 8). A strip of PTFE is placed between the serrated surface before the sleeves are secured together. The ends of the sleeves are capped. The sleeves are with inlet (16) and outlet (18) port at the ends. The sleeves are dimensioned to allow an annular chamber (25) between the original pipe (20) and the sleeves (22). Upon installation of the sleeves the ends are capped using either fast epoxy curing resins or elastomeric seals (27) which are compressed when the sleeves are bolted or welded together or secured by other known means in the art.

The annulus gap typically will range from 12.7 mm to perhaps maximum of 76.2 mm and will be dependent upon surface condition of the effected area i.e. dents, weld protrusions, out of dimension pipe etc. The size of the annulus shall be calculated to provide sufficient sheer and axial load carrying capacity. In addition grout (29) can be formulated with additives or aggregates to either insulate the pipe (reduce thermal shock especially at the splash zone) or to reduce shrinkage of the epoxy.

All ambient water present in the annular chamber (25) should be discharged by means of the application of compressed air or other inert gas with a pressure not exceeding 9.7 bar (140 psi) entering through the inlet port (16) and allowing discharge through the outlet port (18). The maximum pressure stated is for indicative purposes only and is dependent upon the capacity of the end seals.

Upon removal of all ambient water from the annular chamber (25) by means of compressed air or inert gas, the annular chamber (25) is flushed with fresh water. The fresh water is injected from the inlet port (16) and allowed to exit at the outlet port (18). The fresh water is pumped at a pressure not exceeding 9.7 bar (140 psi). The procedure is continued until complete discharge of all contaminants. Upon completion of the above, the fresh water is discharged by means of introduction of inert gas. This procedure is continued until all moisture is discharged from the annular chamber (25). The pressure in the annular chamber (250 during the injection of the inert gas shall not exceed 9.7 bar (140 psi).

Finally a load bearing grout capable of curing under water is then injected into annular chamber (25) of the sleeves through the pre-installed inlet and outlet port (16, 18). The maximum injection pressure shall not exceed 9.7 bar (140 psi).

Load bearing filler material used in this present invention is either epoxy based or cementitious grout. The epoxy should have low viscosity, designed for application with automatic meter, mix and dispense pressure injection equipment. The physical properties allow its use in applications requiring high load bearing strength and excellent adhesion under adverse application conditions. It should have a long working life and low exotherm reaction (minimal heat generation during cure that make it suitable for applications where a relatively large mass of adhesive is employed. Preferably the epoxy should have a high degree of chemical and radiation resistance attainable in the ambient temperature. The injected epoxy is left to cure in accordance with manufacturer's recommendations.

The cementitious grout should have high compressive strength and should be pumpable and similarly should be left to cure as per manufacturer's recommendations. The epoxy/grout completely integrates the sleeves (22) and the existing pipe (20) providing additional structural reinforcement. The sleeves (22) isolate the pipe thus preventing further external corrosion and being bonded to the pipe (20) further strengthens the pipe. The fibre reinforced wrap (21) contains leaks within corroded area and in conjunction with the load bearing grout (29) contains the hoop stresses experienced by the pipe. The axial loads are contained by making sleeves longer than the affected area.

Figure 6:
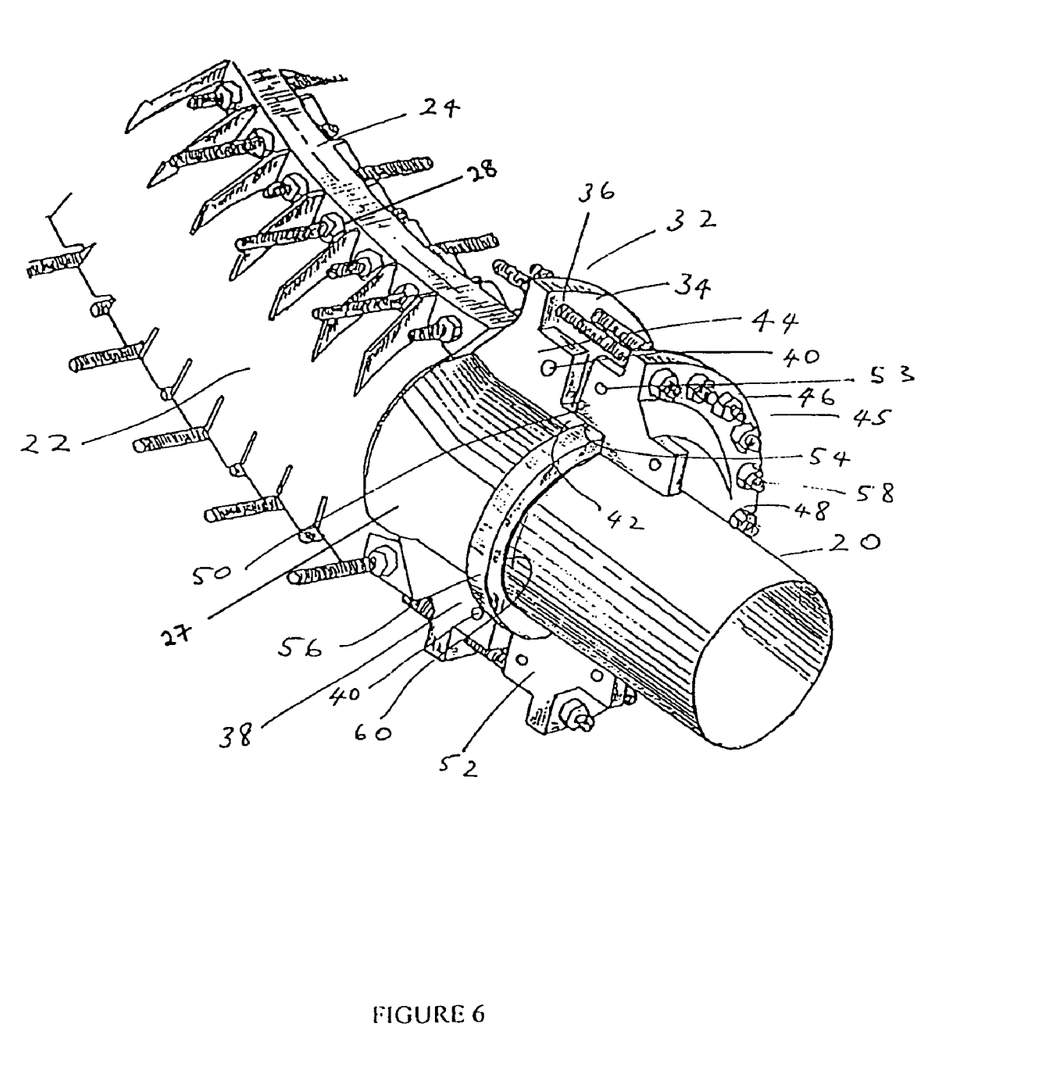
FIG. 6 shows a cut away perspective view of a pipe being repaired with half sleeves and terminating means
Figure 7:
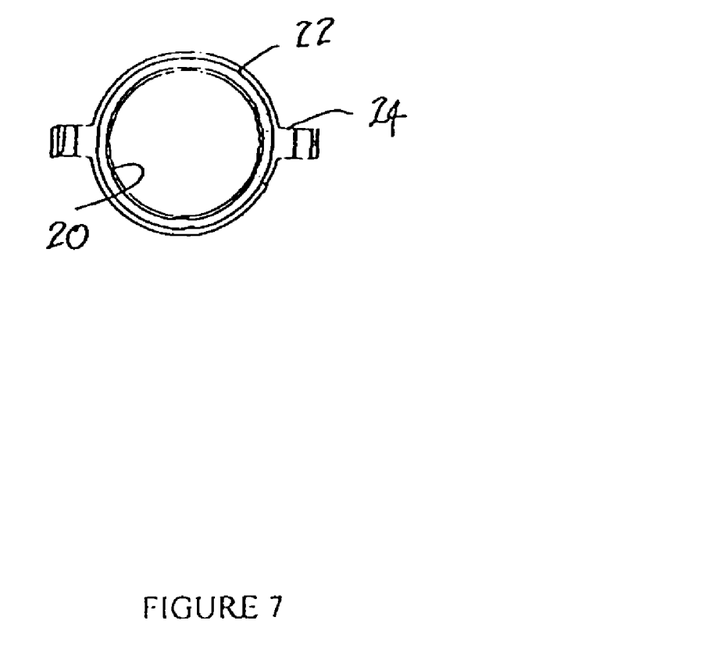
FIG. 7 shows a radial cross-sectional view of the pipe shown in FIG. 6.

In another aspect of the invention, there is disclosed a pair of end flanges integrally secured to the pair of matingly engageable steel sleeves and a pair of independent terminal flanges, which are matingly engageable to the said end flanges (see FIG. 6). It will be appreciated that instead of terminal ends of the matingly engageable steel sleeves being sealed by means of curing resins or elastomeric Seals, metal flanges are used to provide more secure end sealing effect.

Referring to FIG. 6, there is shown a sectional view of a riser/pipeline (20) to which is secured a pair of half sleeve pipes (22). Each half sleeve pipe (22) is a diameter larger than the diameter of the intended riser/pipeline (20) which it is proposed to cover. The half sleeve includes a flange (24) at the terminal edges, said flange extending throughout the length of the half sleeve. Each of the half sleeve pipes includes a longitudinal serrated strip (26) extending throughout the length. The longitudinal serrated strip is designed to secure a longitudinal seal (27), such as an elastomeric seal (such as PTFE), copper seal or any other seal capable of being compressed between the two half sleeves to prevent leakage of materials contained within the two half sleeves when assembled together. The flanges include a plurality of spaced apart apertures (28) to accommodate nuts and bolts which are used to connect the two half sleeves.

Instead of the two half sleeves being secured together by means of flanges (24), it is possible to secure the half sleeves by welding along the edges. In this embodiment, there is no need for flanges at the half sleeves, neither is there a need for longitudinal serrated strips on the flanges.

Figure 9:
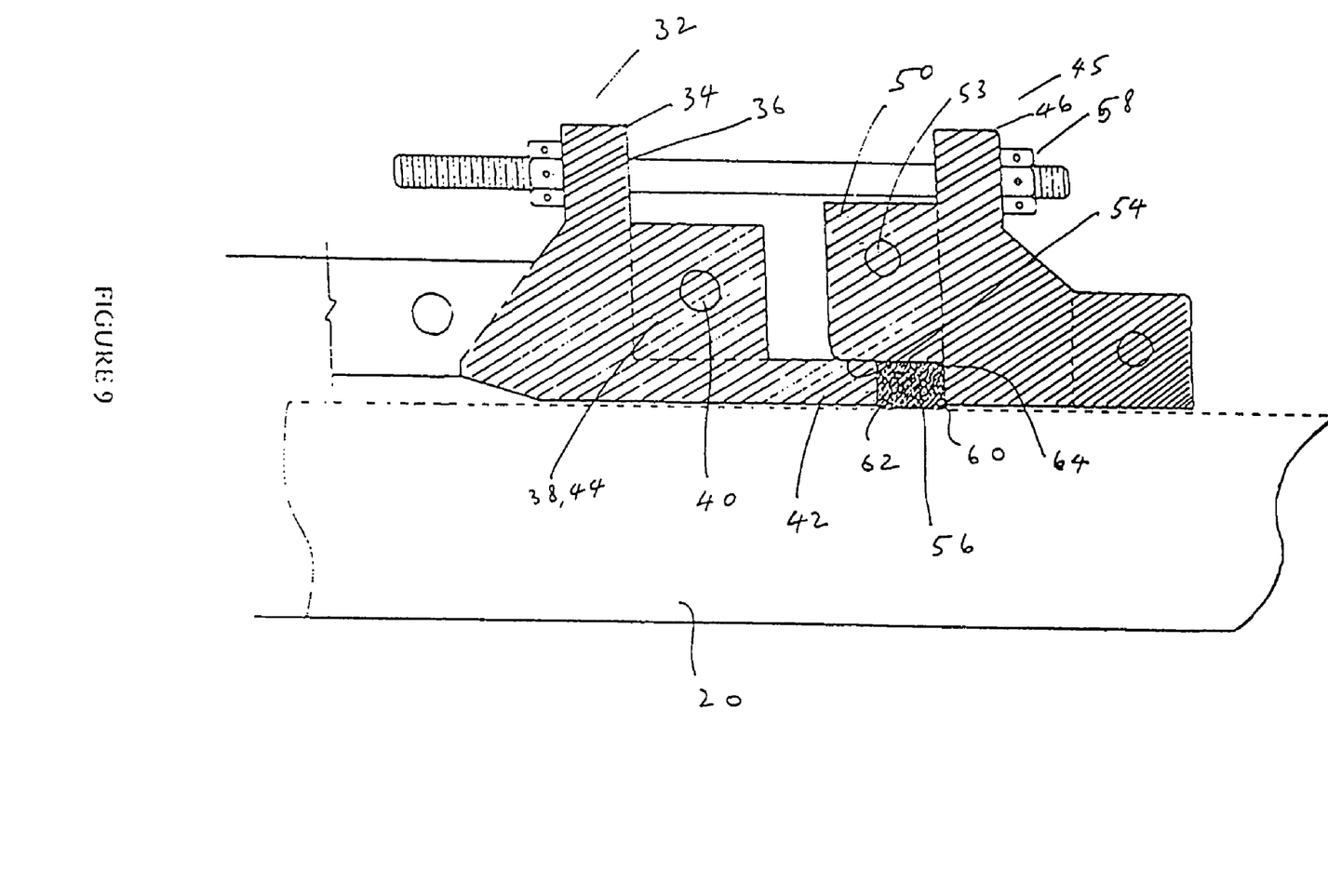
FIG. 9 shows a sectional view of the terminating means.

Each terminal end of each half sleeve includes an end-flange body (32) integrated with the rest of the half sleeve. The end-flange body (32) includes two flange portions (38, 44) co-planar to the flange (24) in the rest of the sleeve. The said flange (38) includes apertures (40) to accommodate nuts and bolts when securing the end-flange body (32) to a corresponding end-flange body of the other half sleeve. Integral to the end-flange body is semi-circular lip (42) extending forward from the semi-collar (34).

The invention further includes a terminator body (45) structurally configured to be secured to the end-flange body (32). The terminator body (45) is independent and comprises of two identical halves to be secured to the two end-flange bodies (32). Each terminator body (45) includes a semi-circular collar (46) with spaced apart apertures (48). It also includes one pair of flanges (50, 52) each with an aperture (53). The flanges (50) are positioned in a manner such that two terminator bodies placed in mirror image to each other are securable to each other by nuts and bolts. The terminator body further includes semi-circular recess (54) dimensioned and configured to receive the semi-circular lip (42) from the end-flange body (32).

Figure 10:
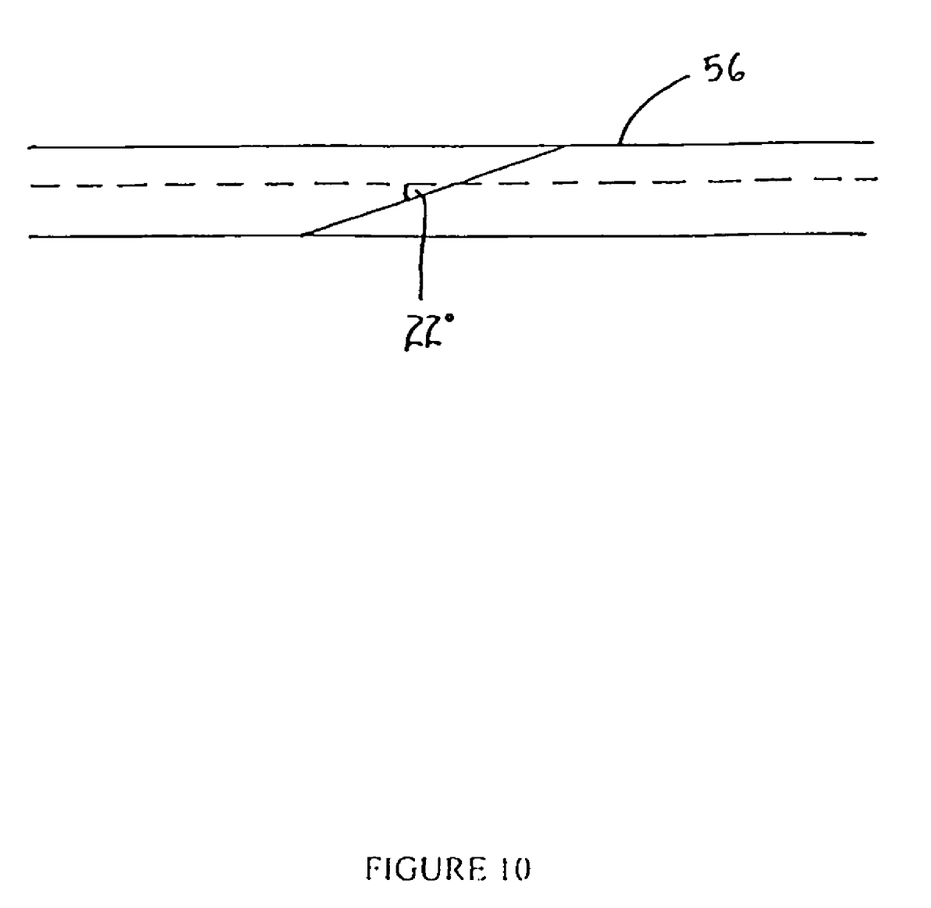
FIG. 10 shows details of graphite ring splice.

The working of the end connector comprising of the end-flange body and the terminator body will be described now. The half sleeve with the end-flange body (32) is positioned on the pre determined position of the riser pipe (20). The longitudinal seals (27) are placed in position along the longitudinal serrated strips. A graphite ring (56) formed by two semi-circular graphite strips is placed in the semi-circular recess (54). Preferably the terminal edges of semi-circular graphite strips is obliquely cut to provide a more effective seal (see FIG. 10). Three mild steel rings (60, 62, 64) are positioned adjacent to graphite ring. The rings are provided to prevent any extrusion of graphite while compressing the graphite seal to activate. The half sleeves and the end-flange bodies are secured together by nut and bolt means (or alternatively are welded together).

After positioning the graphite ring (56), the terminator bodies (45) are placed in registration with the end-flange bodies and are compressed against the end-flange body to a desired compression value to activate the graphite ring as a seal. The graphite ring will change its shape during external compression and fill up voids and gaps if any in that area. At the same time, the density of the graphite ring will increase due to additional compression. The additional compression force required to compress the graphite ring is calculated based on the graphite manufacturer's recommendation and on field requirements. It will be appreciated that the terminator bodies (45) are compressed against and secured to the end-flanges by means of the plurality of nuts and bolts (58).

It will be appreciated that the provision of a semi-circular recess and a matingly engageable semi-circular lip can be present in the flange body and in terminator body respectively instead as described above.

This invention is developed to solve problems presented by large, high temperature risers/pipes operating up to 100° C. or higher, causing thermal shock at the splash zone, failure of the protective coating; and the resulting accelerated corrosion.

The purpose of the invention is to provide a cost effective technology to repair and/or rehabilitate these pipelines/risers operating at high pressures without suspending production, and to solve the problems caused by the accelerated rates of corrosion.

The advantages of this invention are it does not require de-rating of pipeline or suspending production; it does not require expensive heavy duty connectors to take the axial loads or to contain leaks via seals normally incorporated within the connectors; does not require welding on the pipe to be repaired; and it overcomes the limitations of epoxy sleeves and fibre reinforced wraps used independently.

The above invention is used for pipelines submerged in water or sea. Alternatively the same method can be done for pipelines on land except the procedures are modified whereby the two half oversized steel sleeves can be welded together and the flushing with fresh water will no longer be required. The unwanted matter can be flushed out using compressed air or inter gas.

The invention claimed is:

1. A method of repairing a leaking, damaged or weakened area in pipeline (20) section characterized in that the method includes:
    a) removing rust, old coating and other unwanted surface blemishes on the leaking, damaged or weakened surface area and the surface beyond the leaking, damaged or weakened surface portion of the pipeline (20);
    b) wrapping the leaking, damaged or weakened surface portion of the pipeline referred in step (a) above by having at least one layer of reinforced composite wrap material (21);
    c) allowing the reinforced composite wrap material (21) to cure;
    d) enclosing total surface areas referred to in step (a) with two half oversized steel sleeves (22);
    e) sealing terminal annulus ends of sleeves;
    f) removing non-gaseous matter in annular chamber (25) formed by sleeves (20), pipe and seals formed in step (e);
    g) introducing a load bearing epoxy or cementitious grout (29) or a combination of both into the annular chamber (25);
    h) allowing the load bearing epoxy or cementitious grout to cure,
    wherein
        at least one wear plate is placed between the pipeline and the reinforced composite wrap material;
        the reinforced composite wrap material (21) consists of fiber reinforced material pre-impregnated with a resin that can be activated by one of fresh water and salt water;

the reinforced composite wrap is wrapped in spiral manner on the external surface of the pipeline;

the non-gaseous matter is removed by flushing the non-gaseous matter with fresh water followed by flushing with inert gas or atmosphere air;

the terminal annulus ends are sealed by hermetically securing a pair of terminator bodies (45) to a pair of flange bodies (32), said flange bodies integral to the two half oversized steel sleeves (20); and the pair of terminator bodies (45) are compressed against the pair of flange bodies (32) by means a plurality of nuts and bolts (58).

2. A method of repairing a leaking, damaged or weakened area in pipeline (20) as claimed in claim 1 wherein two semi-circular graphite bodies (56) with angular cut terminal ends are introduced between the pair of terminator bodies (45) and the pair of flange bodies (32) to form a circular ring.

3. A method of repairing a leaking, damaged or weakened area in pipeline (20) as claimed in claim 2 wherein a plurality of metallic rings (60, 62, 64) are placed along the peripheral surface of the graphite bodies (56) now formed into a circular ring to prevent any extrusion of the graphite when compressed.

* * * * *